July 7, 1931.  C. F. RAYFIELD  1,813,765
FERTILIZER
Filed Feb. 5, 1930   2 Sheets-Sheet 1
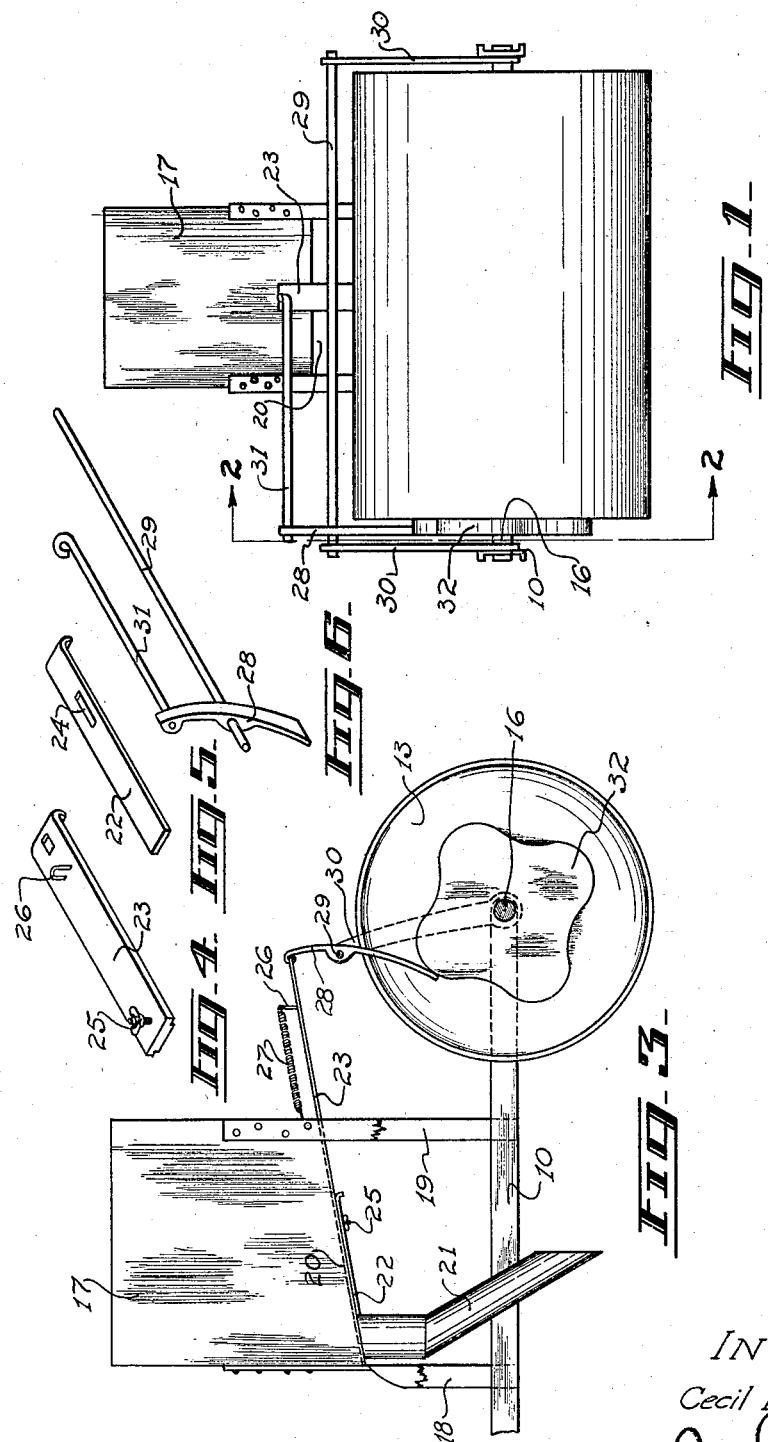
INVENTOR
Cecil F. Rayfield
his Attorney

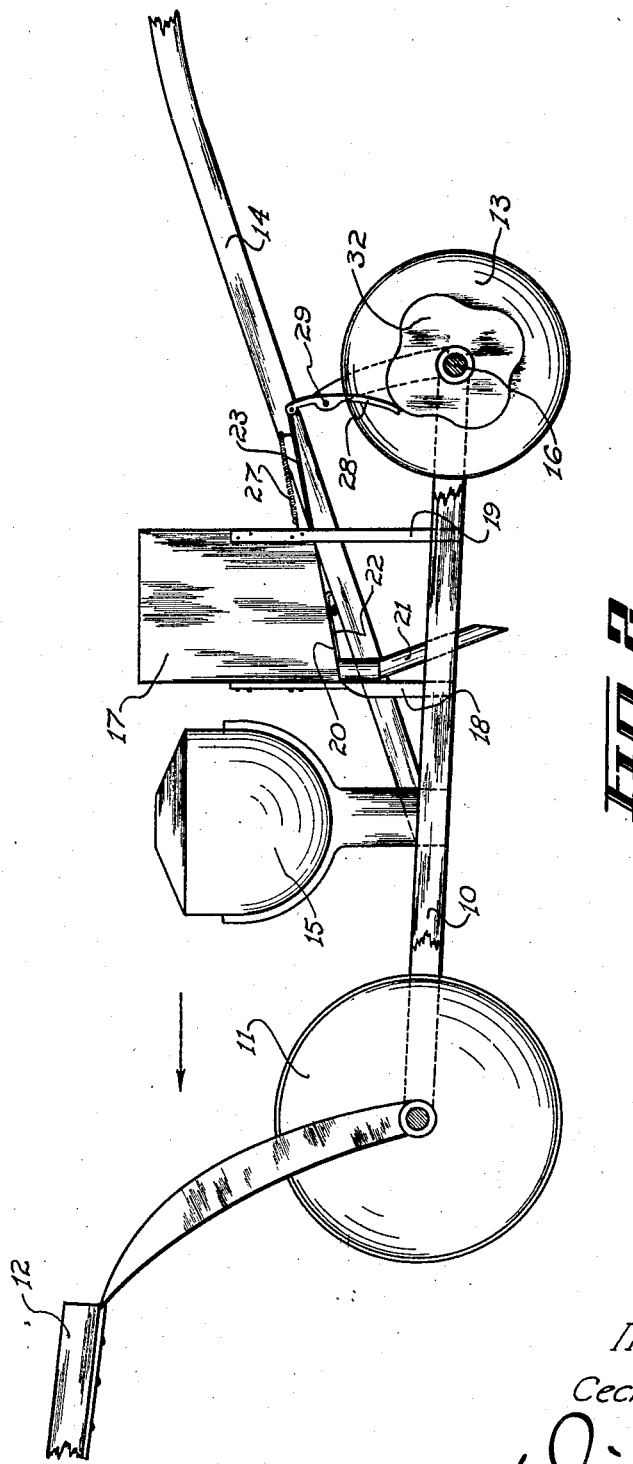

Patented July 7, 1931

1,813,765

UNITED STATES PATENT OFFICE

CECIL F. RAYFIELD, OF WALDEMAR, ONTARIO, CANADA

FERTILIZER

Application filed February 5, 1930. Serial No. 426,119.

This invention relates to improvements in a fertilizer and appertains particularly to a device of this sort in the form of an attachment for a turnip seeder or other similar planting implement of conventional design.

An object of the invention is to provide an efficient yet simple fertilizing device adapted to be readily attached to a seeder of usual type whereby the machine could serve the dual purpose of a seeder or fertilizer or as an implement for performing both the seeding and fertilizing operations at the same time.

A further object of the invention is to provide a fertilizer having an easily adjusted feed control whereby the quantity of fertilizer to be spread may be regulated.

A still further object of this invention is the provision of a device of this nature and for the purpose set forth that is characterized by structural simplicity, durability, ease of installation and operation and low cost of production being thereby rendered commercially desirable.

To the accomplishment of these and related objects as shall become apparent as the description proceeds, my invention resides in the construction, combination and arrangement of parts as shall be hereinafter more fully described, illustrated in the accompanying drawings and pointed out in the claim hereunto appended.

The invention will be more clearly described, and will be best understood when reference is had to the drawings forming a part of this disclosure and wherein like characters indicate like parts throughout the several views.

In the drawings:—

Figure 1 is a rear elevation of a possible embodiment of this invention;

Figure 2 is a sectional side elevation thereof as taken on the line 2—2 of Figure 1;

Figure 3 is an enlarged detail sectional elevation of the actuating mechanism of my fertilizer;

Figure 4 is a perspective view of the feed control shutter operator;

Figure 5 is a perspective of the feed control shutter; and

Figure 6 is a perspective elevation of the cam actuated trip.

The machine, on which my fertilizer attachment is mounted, is shown as including a frame 10, front wheels 11, a draft tongue 12, a rear supporting roller 13 and a pair of guide handles 14 and an ordinary seed container 15 operating in any suitable way. —As the particular construction or design of the body of the seeder proper is only incidental to the invention, further allusions to it per se will not be made in this explanation.

Between the seed container 15 and the rear supporting roller 13 carried by the rotatable axle 16, I locate the fertilizer hopper 17 supported from the frame 10 by the front and rear brackets or standards 18 and 19 respectively, on each side. The bottom 20 inclines downwardly from the back to front. At the forward edge of the bottom, centrally of the sides thereof, and extending back therefrom, is a feed opening with which the upper end of the delivery chute 21 registers.

A closure for this feed opening, in the form of a shutter 22 is adapted to reciprocate over the upper end of the delivery chute 21 to control the flow of fertilizer down the chute. The flow or feed is further regulated by the adjustment of the shutter 22 with respect to its extension or actuator 23 that projects back of the hopper by providing an elongated slot 24 near the rearward end of the shutter 22 and locking bolt and wing nut 25 positioned in the forward end portion of the extension 23 adapted to pass through the elongated slot and serve to adjustably join the shutter and its extension in the desired relation. Toward the rear of the extension 23 an upstanding loop 26 receives one end of a stretched coil spring 27 that also fastens to the rear of the hopper 17.

The shutter 22 and its actuating extension 23 are reciprocated by the action of a trip or rocker arm 28 pivoting on the transverse rod 29 whose ends are mounted in the carrying brackets 30 connected at their basis to the frame 10. A rigid rod link 31 joins the upper end of the trip 28 with the rearward end of the shutter extension while the lower end of the trip or rocker arm is normally held in engagement with the multiple cam member 32 keyed to the rear axle 16, by the tension of the coil spring 27 acting on the shutter extension 23 connected with the upper end of the rocker arm.

The device has been shown and described as for operation with a small turnip seeder planting a single row at a time so that consequently only one chute for spreading the fertilizer was necessary, but when a larger type of seeder is used that could plant an eight or twelve foot strip on each trip across the field, it is obvious that a wide fertilizer hopper would be employed and provided with a suitable number of spaced feed chutes. And further, in the event of a wide machine with numerous feed spouts, a more direct driving connection between the rocking trip and the shutter extension would be utilized.

As the constructural details of the invention have been explained minutely from the standpoint of form and connection, there now follows but a brief reference to the use and modus operandi of the device. As the implement is advanced over the field by any desired draft means, the seeder operates in its usual way or not, as predetermined by the operator and the rear roller, caused to rotate by its engagement with the ground, rotates the axle and the cam member on its end that in turn actuates the trip and reciprocates the feed shutter. As the quantity of fertilizer it is desired to spread may vary, the adjustable connection between the shutter and its extension is provided so that the size of the opening between the hopper and feed chute may be regulated, the shutter reciprocating to open the full width of the opening at the top of the chute or only part way as desired.

From the foregoing description taken in connection with the accompanying drawings, it will be manifest that a fertilizer is provided that will fulfill all the necessary requirements of such a device, but as many changes could be made in the above description and many apparently widely different embodiments of my invention constructed within the scope of the appended claim without departing from the spirit or scope thereof, it is intended that all matters contained in the said accompanying specification and drawings shall be interpreted as illustrative and not in a limited sense.

Having thus described my invention, what I claim as new and desire to secure by Letters Patent is:—

An improved farm implement comprising a frame, a supporting roller, a rotatable axle therefor, a cam keyed thereto, a rocker arm engaging said cam and adapted to be teetered thereby, a hopper, a feed chute therefrom, a sliding shutter in the opening between said hopper and chute, an extension joined to said shutter and adjustable longitudinally thereof, a spring acting on said extension to hold said shutter in normally closed position and an operative connection between said rocker arm and said shutter extension to cause reciprocation of the latter.

In testimony whereof I hereunto affix my signature.

CECIL F. RAYFIELD.